United States Patent
Wu

(10) Patent No.: US 11,016,641 B2
(45) Date of Patent: May 25, 2021

(54) METHOD AND APPARATUS FOR TAKING SCREENSHOT OF SCREEN OF APPLICATION IN MOBILE TERMINAL

(71) Applicant: Honor Device Co., Ltd., Shenzhen (CN)

(72) Inventor: Weibin Wu, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 16/100,495

(22) Filed: Aug. 10, 2018

(65) Prior Publication Data

US 2018/0348999 A1    Dec. 6, 2018

Related U.S. Application Data

(63) Continuation of application No. 14/262,171, filed on Apr. 25, 2014, now Pat. No. 10,078,434, which is a
(Continued)

(30) Foreign Application Priority Data

Oct. 26, 2011   (CN) .......................... 201110329295.3

(51) Int. Cl.
  *G06F 3/048*   (2013.01)
  *G06F 9/451*   (2018.01)
  *G06F 3/0484*  (2013.01)

(52) U.S. Cl.
  CPC .......... *G06F 3/04845* (2013.01); *G06F 9/451* (2018.02)

(58) Field of Classification Search
  CPC .............................. G06F 3/04845; G06F 9/451
  See application file for complete search history.

(56) References Cited

U.S. PATENT DOCUMENTS 5,731,813 A * 3/1998 O'Rourke ............. G06F 3/0481
                                                   715/775
10,078,434 B2   9/2018 Wu
(Continued)

FOREIGN PATENT DOCUMENTS

CN       1976339 A     6/2007
CN     101075172 A    11/2007
(Continued)

OTHER PUBLICATIONS

"Screen capture—get a screen capture of a figure frame or component","https://www.mathworks.com/matlabcentral/fileexchange/24323-screencapture-get-a-screen-capture-of-a-figure-frame-or-component?requestedDomain=www.mathworks.com", Jun. 1, 2009, 12 pages (Year: 2009).*

(Continued)

*Primary Examiner* — Arpan P. Savla
*Assistant Examiner* — Haimei Jiang
(74) *Attorney, Agent, or Firm* — Slater Matsil, LLP

(57) ABSTRACT

A mobile terminal having a display, processor, and storage medium storing a program including instructions to display a first interface of the first application in full size with a status bar, obtain a first screenshot of the first application that includes only a portion of the first interface, display a second interface of the second application in full size with the status bar, obtain a second screenshot of the second application that includes only a portion of the second interface, detect a browsing operation for background applications, display the first screenshot in response to the browsing operation, delete the first screenshot in response to a second operation, detect a switching operation by the user, and switch to running the second application in the foreground in response to the switching operation.

17 Claims, 3 Drawing Sheets

Related U.S. Application Data continuation of application No. PCT/CN2012/083012, filed on Oct. 16, 2012.

(56) References Cited

U.S. PATENT DOCUMENTS

| | | | |
|---|---|---|---|
| 2002/0169784 A1* | 11/2002 | Cha | G06F 16/2264 |
| 2006/0161847 A1* | 7/2006 | Holecek | G06F 3/0481 |
| | | | 715/716 |
| 2007/0033544 A1* | 2/2007 | Fleisher | G06F 3/0481 |
| | | | 715/800 |
| 2007/0094675 A1 | 4/2007 | Ryan | |
| 2007/0118800 A1* | 5/2007 | Moore | G11B 27/34 |
| | | | 715/730 |
| 2007/0300151 A1* | 12/2007 | Araki | G06F 16/9577 |
| | | | 715/249 |
| 2008/0109753 A1* | 5/2008 | Karstens | G06F 9/542 |
| | | | 715/802 |
| 2008/0177994 A1* | 7/2008 | Mayer | G06F 9/4418 |
| | | | 713/2 |
| 2009/0083668 A1 | 3/2009 | Aizawa et al. | |
| 2009/0249189 A1 | 10/2009 | Jania et al. | |
| 2009/0300498 A1* | 12/2009 | Falchuk | G06F 16/44 |
| | | | 715/719 |
| 2010/0017746 A1* | 1/2010 | Husoy | G06F 3/0484 |
| | | | 715/781 |
| 2010/0107115 A1* | 4/2010 | Sareen | G06F 9/451 |
| | | | 715/783 |
| 2010/0164995 A1* | 7/2010 | Choi | H04N 19/59 |
| | | | 345/667 |
| 2011/0083185 A1 | 4/2011 | Sheleheda et al. | |
| 2011/0113427 A1* | 5/2011 | Dotan | G06F 21/53 |
| | | | 718/1 |
| 2011/0173627 A1 | 7/2011 | Murakami et al. | |
| 2011/0258486 A1* | 10/2011 | Bhogal | G06F 11/1441 |
| | | | 714/15 |
| 2012/0081375 A1* | 4/2012 | Robert | G06F 9/451 |
| | | | 345/522 |
| 2014/0089858 A1* | 3/2014 | Yu | G06F 9/451 |
| | | | 715/835 |

FOREIGN PATENT DOCUMENTS

| | | |
|---|---|---|
| CN | 101078980 A | 11/2007 |
| CN | 101122857 A | 2/2008 |
| CN | 101383889 A | 3/2009 |
| CN | 101477440 A | 7/2009 |
| CN | 101655808 A | 2/2010 |
| CN | 102521020 A | 6/2012 |
| JP | 2008117181 A | 5/2008 |
| KR | 20100092613 A | 8/2010 |
| WO | 2010027089 A1 | 3/2010 |

OTHER PUBLICATIONS

"Optimus Pad," Impress Japan Corporation, 1st Edition, Jun. 11, 2011, pp. 10 & 29.

Alman, Y., "ScreenCapture—get a screen-capture of a figure frame or component," Jun. 1, 2009, 7 pages.

"Next Year's Smartphone Turn Out This Way? See the New Features of Antroid 4.0," Kadokawa Corporation, ASCII.jp, http://ascii.jp/elem/000/000/643/643618/index-2.html, Oct. 19, 2011, 2 pages.

"Next Year's Smartphone Turn Out This Way? See the New Features of Antroid 4.0," Kadokawa Corporation, ASCII.jp, http://ascii.jp/elem/000/000/643/643618, Oct. 19, 2011, 3 pages.

Friesen, J., http://www.javaworld.com/article/2071755/learn-java/capture-the-screen.html, "How-To Capture the Screen," Capture Screen Javaworld, Apr. 24, 2006, 13 pages.

htttp://stackoverflow.com/questions/7520076/how-not-to-allow-the-ios-from-taking-a-screen-capture-of-your-app-before-going-i, "How Not to Allow the iOS from Taking a Screen Capture of Your App Before Going into Background,", Sep. 22, 2011, 4 pages.

https://web.archive.org/web/20040917003850/http://www.math.uni-hamburg.de/doc/java/tutorial/uiswing/events/windowlistener.html, "How to Write Window Listeners," Sep. 17, 2004, 6 pages.

"Join the Stack Overflow Community," Take Screenshot at Specified resolution—Stack Overflow, downloaded from http://stackoverflow.com/questions/6760996/take-screenshot-at-specified-resolutions on Mar. 19, 2017, 2 pages.

Seo, D., "'Extreme makeover' ice cream sandwich, What has been changed?," iT dongA, http://it.donga.com/7117/, Oct. 21, 2011, 7 pages.

"ShareX," http://store.steampowered.com/app/400040/, realease date Oct. 1, 2007, 2 pages.

Singh, T., "Android 10 HoneyComb Features, Screenshots," Geeknizer, http://geeknizer.com/android-3-0-honeycomb-features-screenshots, Jan. 27, 2011, 6 pages.

* cited by examiner

METHOD AND APPARATUS FOR TAKING SCREENSHOT OF SCREEN OF APPLICATION IN MOBILE TERMINAL This application is a continuation of U.S. patent application Ser. No. 14/262,171, filed on Apr. 25, 2014, which is a continuation of International Application No. PCT/CN2012/083012, filed on Oct. 16, 2012, which claims priority to Chinese Patent Application No. 201110329295.3, filed on Oct. 26, 2011, both of which are hereby incorporated by reference in their entireties.

TECHNICAL FIELD

The present invention relates to the field of mobile terminals and, in particular embodiments, to a method and an apparatus for taking a screenshot of a screen of an application in a mobile terminal.

BACKGROUND

With the development of mobile terminals, most smartphones have an Android system installed. Android is an open-source software platform of Google for developing mobile programs, and includes an operating system, middleware, and some key applications. Activity is a standard component of the Android platform. In fact, an Activity is a single screen in an application, which is inherited from the Activity class, and displays a UI formed by Views and responds to events.

SUMMARY OF THE INVENTION

The inventor finds, after analysis of the prior art, that the prior art has at least the following disadvantages. In the prior art, during management of application scenarios such as a task manager and a Home desktop application program on the Android platform, only screens of applications running in background can be obtained and screens of all history applications cannot be obtained. As a result, a user cannot easily find an application to be switched to, and therefore a UI (User Interface) is not of much effect during application switching, leading to indirect display and poor user experience.

Embodiments of the present invention provide a method and an apparatus for taking a screenshot of a screen of an application in a mobile terminal. Technical solutions are described below.

A method for taking a screenshot of a screen of an application can be used with a mobile terminal. An instruction for closing a screen of a designated application is received. A designated area of the screen of the designated application is captured to obtain a screenshot of the designated area. The screenshot of the designated area and say and the screen of the designated application is closed.

An apparatus for taking a screenshot of a screen of an application in a mobile terminal is also provided. A receiving module is configured to receive an instruction for closing a screen of a designated application. A screenshot module is configured to capture a designated area of the screen of the designated application to obtain a screenshot of the designated area. A sending module is configured to save the screenshot of the designated area and to close the screen of the designated application.

The technical solutions provided in the embodiments of the present invention have the following beneficial effects. Before an Activity of an application is closed and when the window of the Activity is still visible, a screenshot of the screen of the application is taken to obtain the last real screen of the Activity. In this way, high memory usage that is caused by taking a screenshot after the screen of the application is closed is avoided. Therefore the screen capturing efficiency is improved and memory usage and the number of invocation times are reduced.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the embodiments of the present invention are described in further detail below with reference to the accompanying drawings.

Before the method for taking a screenshot of a screen of an application that is provided in the present invention is introduced, basic knowledge for the present invention is briefly introduced first.

Activity is a standard component of the Android platform. In fact, an Activity is a single screen in an application, which is inherited from the Activity class, and displays a UI formed by Views and responds to events.

History Activity refers to Activities once started by a user, including Activities in a task running in background.

SurfaceView is a special view class of the Android platform. It is the parent class of two 3D view classes GLSurfaceView and RSSurfaceView. The two 3D view classes both run on their independent drawing threads. Therefore, SurfaceView is different from other common view classes.

Live Wallpaper refers to a live wallpaper of the Android platform, which is generally implemented by the RSSurfaceView view class.

ActivityManagerService refers to an Activity management service, which is a key system service on the Android platform.

WindowManagerService refers to a Window management service, which is a key system service on the Android platform.

TaskManager refers to a task manager, which is an Android application program with functions such as task displaying, switching, and killing.

Figure 1:
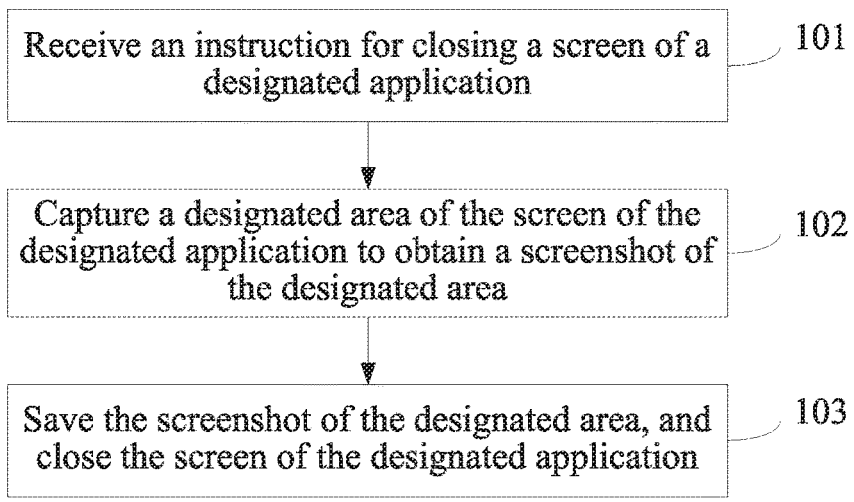
FIG. 1 is a flowchart of a method for taking a screenshot of a screen of an application in a mobile terminal according to an embodiment of the present invention.

FIG. 1 is a flowchart of a method for taking a screenshot of a screen of an application in a mobile terminal according to an embodiment of the present invention. This embodiment is executed by a mobile terminal. Referring to FIG. 1, this embodiment specifically includes the following steps.

101. Receive an instruction for closing a screen of a designated application.

In this embodiment, at least one application runs on the mobile terminal, and the application may be in a full-screen state currently. The instruction for closing the screen of the designated application is a switching instruction for switching the designated application to running in background, or a switching instruction for switching another application to running in foreground, or a closing instruction for closing the designated application. When the instruction is the switching instruction for switching the designated application to running in background, the instruction may be triggered manually by a user of the mobile terminal, and is for example, minimizing the designated application. The instruction may also be triggered according to a preset condition. For example, if a designated application is in an idle state for 20 minutes, the switching instruction for switching the designated application to running in background is triggered.

A person skilled in the art may know that the lifecycle of an Activity of an application includes: When an Activity is started, and after a constructor function of Activity( ) is executed, a system invokes an onCreate( ) method to set a global state and resources of the Activity in the onCreate( ) method, and then invokes an onStart( ) method. After the onStart( ) method is executed, the Activity is still visible on screen. An onResume( ) method is executed, and at this time the Activity is in a wait window event in a loop. When the window is partially visible, that is, the Activity is not in front, an onFreeze( ) method of the Activity is invoked, where this method maintains some internal states of the Activity. Then, the window is paused until the Activity comes to the front again, and the onResume( ) method of the Activity is invoked. If the window of the Activity is invisible, it indicates that an onStop( ) method of the Activity is invoked. An onRestart( ) method of the Activity is not invoked until the window of the Activity is closed, and then the onStart( ) method is repeated. When the system recycles resources or a finish( ) method of the Activity is invoked, the Activity is stopped, and onDestroy( ) is invoked to release resources occupied by the Activity.

102. Capture a designated area of the screen of the designated application to obtain a screenshot of the designated area.

In this embodiment, the designated area may be the entire screen of the application, or an area preset by the mobile terminal, which is not limited in this embodiment of the present invention. By performing screen capturing on the designated area, a view of a status bar may be obtained, and it may be further determined whether the screenshot includes the status bar as required.

It should be noted that step 102 of this embodiment is performed after the instruction for closing the screen of the designated application is received and before the screen of the designated application is closed. Compared with the description of the lifecycle of an Activity in the prior art in step 101, screen capturing in the prior art is performed after the onStop( ) method is invoked, while screen capturing in the present invention is performed after an onPause( ) method is invoked and before the onStop( ) method is invoked.

103. Save the screenshot of the designated area, and close the screen of the designated application.

In this embodiment, after saving the screenshot of the designated area, the mobile terminal closes the screen of the designated application, and according to the received instruction, closes the designated application or switches the designated application to running in background.

After step 103, this embodiment further includes when an instruction for viewing the designated application is received, obtaining the screenshot of the designated area, and displaying the screenshot of the designated area.

In the method provided in this embodiment, before a screen Activity of an application is closed and when the window of the Activity is still visible, a screenshot of the screen of the application is taken to obtain the last real screen of the Activity. In this way, high memory usage that is caused by taking a screenshot after the screen of the application is closed is avoided, and therefore the screen capturing efficiency is improved, and memory usage and the number of invocation times is reduced.

Figure 2:
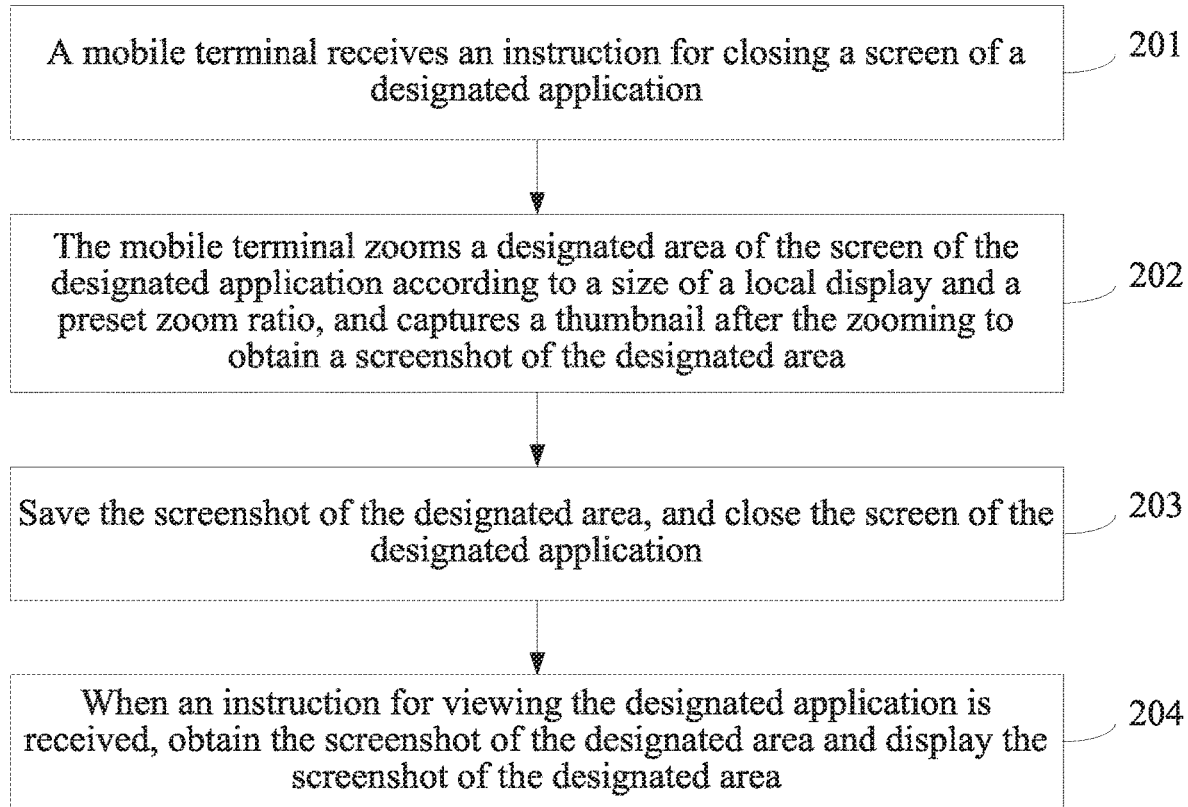
FIG. 2 is a flowchart of a method for taking a screenshot of a screen of an application in a mobile terminal according to an embodiment of the present invention.

FIG. 2 is a flowchart of a method for taking a screenshot of a screen of an application in a mobile terminal according to an embodiment of the present invention. This embodiment is executed by a mobile terminal, and a designated application is currently running on the mobile terminal. Referring to FIG. 2, this embodiment specifically includes the following steps.

201. A mobile terminal receives an instruction for closing a screen of a designated application.

The principle of step 201 is the same as that of step 101 which is not described herein again.

202. The mobile terminal zooms a designated area of the screen of the designated application according to a size of a local display and a preset zoom ratio, and captures a thumbnail after the zooming to obtain a screenshot of the designated area.

In this embodiment, the size of the local display refers to a size of a display of the mobile terminal. Generally, the size of the screen of an application is the same as the size of a local display, that is, an original size of a screenshot is the size of the local display. The designated area of the screen of the designated application may be set by a user of the mobile terminal according to a browsing habit, and the designated area may be a full-screen area of the screen of the designated application, or a certain area of the screen of the designated application. The preset zoom ratio is set by the user of the mobile terminal according to a browsing habit or the like, which is not specifically limited in this embodiment of the present invention. Step 202 specifically includes obtaining, by the mobile terminal, the size of the local display and the preset zoom ratio, and zooming the designated area of the screen of the designated application according to the preset zoom ratio by using the size of the local display as an original size of the screen of the designated application, so as to obtain the thumbnail after the zooming, and capturing the thumbnail after the zooming to obtain the screenshot of the designated area.

A specific method for taking a screenshot may be implemented by invoking drawFB( ). A person skilled in the art may know that drawFB( ) is a drawing method, and in this drawing method, a current image of a display is obtained by invoking a preset display device, a buffer pixel of the preset display device is read, and a Bitmap image is generated by using the buffer pixel. Because drawFB( ) uses the preset display device for drawing, a range of drawFB( ) also covers a status bar of the display, so that the screen capturing range is enlarged.

For example, the drawFB( ) function may specifically be expressed as follows:

```
static void drawFB(JNIEnv* env, jobject jcanvas, SkCanvas* canvas) {
  struct fb_var_screeninfo vinfo;
  int fd;
  int offset;
  int bpp;
  int size;
  int w;
  int h;
  unsigned i;
  unsigned bytespp;
  unsigned char*buf;
  fd = open("/dev/graphics/fbo", O_RDONLY);//Open an fb device
  if (fd < o) {
    return;
  }
  if (ioctl(fd, FBIOGET_VSCREENINFO, &vinfo) < o) {//Read parameters of the fb
device
    close(fd);
    return;
  }
  fcntl(fd, F_SETFD, FD_CLOEXEC);
  bytespp = vinfo.bits_per_pixel / 8;
  bpp = vinfo.bits_per_pixel;
  size = vinfo.xres * vinfo.yres * bytespp;
  w = vinfo.xres;
  h = vinfo.yres;
  /* HACK: for several of our 3d cores a specific alignment
   * is required so the start of the fb may not be an integer number of lines
   * from the base. As a result we are storing the additional offset in
   * xoffset. This is not the correct usage for xoffset, it should be added
   * to each line, not just once at the beginning
   */
  offset = vinfo.xoffset * bytespp;
  offset += vinfo.xres * vinfo.yoffset * bytespp;
  lseek(fd, offset, SEEK_SET);
  buf = (unsigned char*)malloc(size);
  if (buf == NULL){
    close(fd);
    return;
  }
  memset(buf, o, size);
  read(fd, buf, size);//Read fb pixel data
  SkBitmap* bitmap = new SkBitmap( ); //Create a bitmap
{
  SkAutoLockPixels alp(*bitmap);
  //Config KRGB_565_Config if one pixel is described by two Bytes
  if (TWO_BYTES == bytespp) {
    bitmap->setConfig(SkBitmap::kRGB_565_Config, w, h);
  } else {
    bitmap->setConfig(SkBitmap::kARGB_8888_Config, w, h);
  }
  bitmap->setPixels(buf);//Set pixel data of the bitmap as pixels obtained from the fb
device
  canvas->drawBitmap(*bitmap, o, o, NULL);//Draw a bitmap on a canvas
  close(fd);//Close the fb device
  free(buf);//Release buf memory
  bitmap->setPixels(NULL, NULL);//Release the pixel data
}
  delete bitmap; //Recycle the bitmap instance
}
```

203. Save the screenshot of the designated area, and close the screen of the designated application.

In this embodiment, the designated area of the screen of the designated application is captured to obtain the screenshot of the designated area, and after the screenshot of the designated area is saved, the screen of the designated application is closed. The step of closing the screen of the designated application is performed after the screenshot is taken, so that integrity and effectiveness of the screenshot are ensured, a blank screen caused by taking a screenshot after the screen of the designated application is closed is avoided, and screen capturing can be accurately performed for an Activity formed by GLSurfaceView class view elements or RSSurfaceView class view elements, or an Activity with a background of LiveWallpaper class wallpaper.

204. When an instruction for viewing the designated application is received, obtain the screenshot of the designated area, and display the screenshot of the designated area.

In this embodiment, the instruction for viewing the designated application may be an instruction for viewing a history application or an instruction for viewing an application running in background. The instruction may be triggered by starting a task manager of the mobile terminal. For example, when the task manager of the mobile terminal is started, a screenshot of a designated area of an application running in background is displayed and saved, so that a user of the mobile terminal can view the application running in background directly, and learn the last running state of the application running in background. The instruction may be for all history applications or applications running in background, or may be for a certain history application or an application running in background, which is not specifically limited in this embodiment of the present invention. In this embodiment, the mobile terminal may perform operations such as browsing, switching, and releasing on the designated application according to a received operational instruction. Browsing refers to viewing the last running state of the designated application, switching refers to switching the designated application from running in foreground to running in background or switching the designated application from running in background to running in foreground, and releasing refers to deleting the screenshot of the designated area of the designated application.

The foregoing embodiment may be applied to an embedded product that uses the Android platform, such as a tablet computer, a set top box, or a fixed station.

Figure 3:
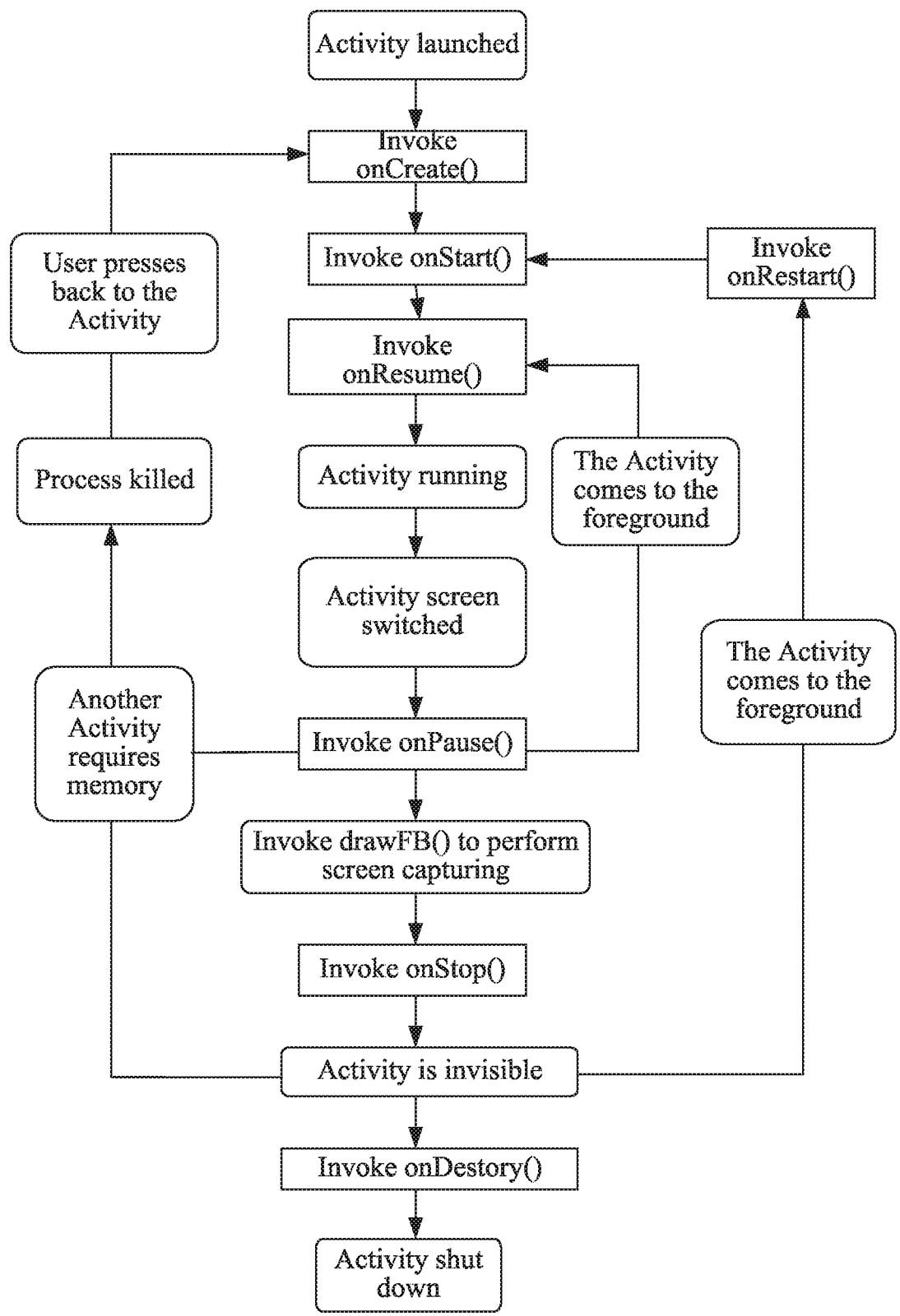
FIG. 3 is a flowchart of an example, in a Java environment, of a method for taking a screenshot of a screen of an application in a mobile terminal according to an embodiment of the present invention.

For example, in the prior art, when a new Activity comes to the foreground, a previous Activity enters an onPause( ) life state, and at this time, the old Activity is still visible. When the window of the old Activity is invisible, the old Activity enters an onStop( ) life state. A screen capturing algorithm of the Android platform is performing capturing in the onStop( ) life state, and because the window is invisible, it is required to redraw the old Activity to obtain a thumbnail of the screen. This not only leads to a low efficiency, but also makes it difficult to obtain the last real screen of the old Activity. Therefore, in this embodiment of the present invention, a screenshot is taken in the onPause( ) life state. Referring to FIG. 3, FIG. 3 is a flowchart of an example, in a JAVA environment, of a method for taking a screenshot of a screen of an application in a mobile terminal according to an embodiment of the present invention. onCreate( ), onStart( ), onRestart( ), onResume( ), drawFB( ), onPause, onStop( ), and onDestroy( ) described in the present invention are all abstract functions which are not implemented specifically and need to be implemented by overriding in a specific application. The lifecycle of an Activity includes the following procedures: When an Activity is launched, onCreate( ), onStart( ) and onResume( ) are invoked sequentially, so that the Activity runs normally. When a screen of the Activity is switched, drawFB( ) is invoked to perform screen capturing, then onStop( ) is invoked, and at this time, the Activity is already invisible. Subsequently, any one of the following three conditions may occur: onDestroy( ) is invoked, and the Activity is shut down; or, when another Activity requires memory, the process is killed, and onCreate( ) is invoked for the another Activity; or when the Activity comes to the foreground again, onRestart( ) is invoked.

According to the method provided in this embodiment, before an Activity of an application is closed and when the window of the Activity is still visible, a screenshot of the screen of the application is taken to obtain the last real screen of the Activity. In this way, high memory usage that is caused by taking a screenshot after the screen of the application is closed is avoided, and therefore the screen capturing efficiency is improved, and memory usage and the number of invocation times is reduced.

Figure 4:
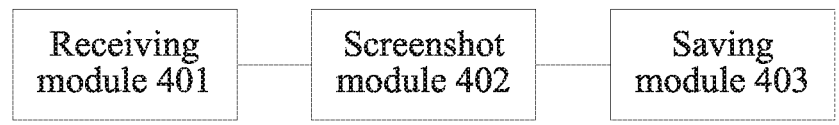
FIG. 4 is a schematic structural diagram of an apparatus for taking a screenshot of a screen of an application in a mobile terminal according to an embodiment of the present invention.

FIG. 4 is a schematic structural diagram of an apparatus for taking a screenshot of a screen of an application in a mobile terminal according to an embodiment of the present invention. Referring to FIG. 4, this embodiment includes a number of modules. A receiving module 401 is configured to receive an instruction for closing a screen of a designated application. A screenshot module 402 is configured to capture a designated area of the screen of the designated application to obtain a screenshot of the designated area. A saving module 403 is configured to save the screenshot of the designated area and to close the screen of the designated application.

The screenshot module 402 includes a zooming unit, which is configured to zoom the designated area of the screen of the designated application according to a size of a local display and a preset zoom ratio. The screenshot module 402 also includes a screenshot unit, which is configured to capture a thumbnail after the zooming to obtain the screenshot of the designated area.

The apparatus further includes a display module, which is configured to, when an instruction for viewing the designated application is received, obtain the screenshot of the designated area, and to display the screenshot of the designated area.

The instruction for closing the screen of the designated application is a switching instruction for switching the designated application to running in background, or a switching instruction for switching another application to running in foreground, or a closing instruction for closing the designated application.

The apparatus provided in this embodiment may specifically be a mobile terminal, and is based on the same conception as the method embodiments. For the specific implementation procedure of the apparatus, reference may be made to the method embodiment for details, which are not described herein again.

All or a part of the foregoing technical solutions provided by the embodiments of the present invention may be implemented by a program instructing relevant hardware. The program may be stored in a readable storage medium. The storage medium includes any medium that can store program code, such as a ROM, a RAM, a magnetic disk, or an optical disc.

The foregoing descriptions are merely exemplary embodiments of the present invention, but are not intended to limit the present invention. Any modifications, equivalent replacements, or improvements made within the spirit and principles of the present invention shall fall within the protection scope of the present invention.

What is claimed is:

1. A mobile terminal, comprising:
a display;
a processor coupled to the display; and
a non-transitory computer-readable storage medium storing a software application and a program to be executed by the processor, the program including instructions to:
launch a first application;
instruct the display to display a first interface of the first application, wherein the first interface is displayed in full size on the display together with a status bar;
minimize the first application in response to a first gesture by a user, wherein the instructions to minimize the first application include instructions to put the first application in an onPause state, obtain a first screenshot of the first application after the first gesture is detected and before the first application is minimized and while the first application is in the onPause state, and put the first application in an onStop state after obtaining the first screenshot, wherein the first screenshot includes only a portion of the first interface, wherein the first screenshot does not include the status bar, wherein the first screenshot shows a last running state of the first application prior to being minimized, wherein the first screenshot is a zoomed-in screen shot of a designated area of the first application, wherein the first screenshot is zoomed in on the designated area according to a preset zoom ratio, and wherein the preset zoom ratio and the designated area are each selected by the user prior to taking the first screenshot;
launch a second application;
instruct the display to display a second interface of the second application, wherein the second interface is displayed in full size on the display together with the status bar;
minimize the second application in response to a second gesture by the user, wherein the instructions to minimize the first application include instructions to put the second application in the onPause state, and obtain a second screenshot of the second application after the second gesture is detected and before the second application is minimized and while the second application is in the onPause state, and put the second application in the onStop state after obtaining the second screenshot, wherein the second screenshot includes only a portion of the second interface, and wherein the second screenshot does not include the status bar, and wherein the second screenshot shows a last running state of the second application prior to being minimized;
detect a first operation by the user for browsing applications running in a background of the mobile terminal;
display the first screenshot in response to the first operation;
detect a second operation by the user;
delete the first screenshot in response to the second operation;
detect a third operation by the user for browsing applications running in the background;
display the second screenshot in response to the third operation;
detect a fourth operation by the user; and
switch to running the second application in a foreground of the mobile terminal in response to the fourth operation.

2. The mobile terminal according to claim 1, wherein the preset zoom ratio is selected according to a browsing habit of the user.

3. The mobile terminal according to claim 1, wherein the instructions to obtain the first screenshot include instructions to:
obtain an image of the first interface;
read a buffer pixel of the display of the mobile terminal, the buffer pixel relating to the image of the first interface; and
generate a bitmap image as the first screenshot by using the buffer pixel.

4. The mobile terminal according to claim 1, wherein the first interface occupies substantially the full size of the display when the first interface is displayed in full size.

5. The mobile terminal according to claim 1, wherein the second screenshot is obtained in a zoom out size according to a preset zoom ratio.

6. The mobile terminal according to claim 1, wherein the instructions to obtain the second screenshot include instructions to:
obtain an image of the second interface;
read a buffer pixel of the display of the mobile terminal, the buffer pixel relating to the image of the second interface; and
generate a bitmap image as the second screenshot by using the buffer pixel.

7. The mobile terminal according to claim 1, wherein the second interface occupies substantially the full size of the display when the second interface is displayed in full size.

8. The mobile terminal according to claim 1, wherein the instructions to instruct the display to display the second interface include instructions to instruct the display to display the second interface of the second application in full size together with the status bar after the second application is switched to run in the foreground.

9. A non-transitory computer-readable storage medium with an executable program stored thereon for execution by an electronic device, wherein the program includes instructions to:
launch a first application;
display a first interface of the first application, wherein the first interface is displayed in full size together with a status bar;
minimize the first application in response to a first gesture by a user, wherein the instructions to minimize the first application include instructions to put the first application in an onPause state, obtain a first screenshot of the first application after the first gesture is detected and before the first application is minimized and while the first application is in the onPause state, and put the first application in an onStop state after obtaining the first screenshot, wherein the first screenshot includes only a portion of the first interface, wherein the first screenshot does not include the status bar, wherein the first screenshot shows a last running state of the first application prior to being minimized, wherein the first screenshot is a zoomed-in screen shot of a designated area of the first application, wherein the first screenshot is zoomed in on the designated area according to a preset zoom ratio, and wherein the preset zoom ratio and the designated area are each selected by the user prior to taking the first screenshot;
launch a second application;
display a second interface of the second application, wherein the second interface is displayed in full size together with the status bar;
minimize the second application in response to a second gesture by the user, wherein the instructions to minimize the first application include instructions to put the second application in the onPause state, and obtain a second screenshot of the second application after the second gesture is detected and before the second application is minimized and while the second application is in the onPause state, and put the second application in the onStop state after obtaining the second screenshot, wherein the second screenshot includes only a portion of the second interface, and wherein the second screenshot does not include the status bar, and wherein the second screenshot shows a last running state of the second application prior to being minimized;
detect a first operation by the user for browsing applications running in a background of the electronic device;
display the first screenshot in response to the first operation;
detect a second operation by the user;
delete the first screenshot in response to the second operation;
detect a third operation by the user for browsing applications running in the background;
display the second screenshot in response to the third operation;

detect a fourth operation by the user; and
switch to running the second application in a foreground of the electronic device in response to the fourth operation.

10. The storage medium according to claim 9, wherein the preset zoom ratio is selected according to a browsing habit of the user.

11. The storage medium according to claim 9, wherein the instructions to obtain the first screenshot include instructions to:
obtain an image of the first interface;
read a buffer pixel of the display of the electronic device, the buffer pixel relating to the image of the first interface; and
generate a bitmap image as the first screenshot by using the buffer pixel.

12. The storage medium according to claim 9, wherein the first interface occupies substantially the full size of the display when the first interface is displayed in full size.

13. The storage medium according to claim 9, wherein the instructions to instruct the display to display the second interface includes instructions to display the second interface of the second application in full size together with the status bar after the second application is switched to run in foreground.

14. A mobile terminal, comprising:
a display configured to display an interface of a launched application, wherein the interface of the application is displayed in full size on the display with a status bar;
a processor coupled to the display; and
a non-transitory computer-readable storage medium storing a software application and a program to be executed by the processor, the program including instructions to:
receive an instruction by a user for minimizing the application, wherein the instructions to receive the instructions by the user for minimizing the application include instructions to put the application in an onPause state; and
generate a screenshot of the application after the instruction is received and before the application is minimized and while the application is in the onPause state, wherein the instructions to receive the instructions by the user for minimizing the application further include instructions to put the application in an onStop state after obtaining the screenshot;
wherein the screenshot of the application includes a portion of the interface of the application in a zoom out size according to a preset zoom ratio, wherein the screenshot shows a last running state of the application prior to being minimized, wherein the screenshot does not include the status bar, wherein the screenshot is a zoomed-in screen shot of a designated area of the application, wherein the screenshot is zoomed in on the designated area according to a preset zoom ratio, and wherein the preset zoom ratio and the designated area are each selected by the user prior to taking the screenshot.

15. The mobile terminal according to claim 14, wherein the program further includes instructions to receive an instruction by the user to browse the screenshot of the application, and wherein the display is further configured to display the screenshot of the application.

16. The mobile terminal according to claim 15, wherein the program further includes instructions to:
detect a switching operation, by the user, on the screenshot of the application, to switch the application to run in a foreground of the mobile terminal; and
switch the application to run in the foreground in response to receiving the switching operation;
wherein the display is further configured to display the application in full size on the display with the status bar after the application is switched to run in the foreground.

17. The mobile terminal according to claim 15, wherein the program further includes instructions to:
receive a deletion operation, by the user, on the screenshot of the application, to close the application in the background; and
close the application in the background in response to receiving the deletion operation.

* * * * *